United States Patent [19]
Yamaoka et al.

[11] Patent Number: 4,809,796
[45] Date of Patent: Mar. 7, 1989

[54] TRANSMISSION SYSTEM FOR WORKING VEHICLES

[75] Inventors: Kojiro Yamaoka, Nishinomiya; Shusuke Nemoto, Midorigaoka, both of Japan

[73] Assignee: Kanzaki Kokyukoki Mfg. Co. Ltd., Amagasaki, Japan

[21] Appl. No.: 108,927

[22] Filed: Oct. 15, 1987

[30] Foreign Application Priority Data

Oct. 24, 1986 [JP] Japan .................. 61-253121

[51] Int. Cl.$^4$ ............................................. B62D 11/02
[52] U.S. Cl. .................................... 180/6.48; 60/484; 180/70.1; 180/308
[58] Field of Search .................. 180/6.2, 6.48, 6.5, 180/9.1, 308, 6.3, 243, 244, 19.3, 305, 307, 70.1; 60/484

[56] References Cited

U.S. PATENT DOCUMENTS

| | | | |
|---|---|---|---|
| 2,374,196 | 4/1945 | Harbers | 180/6.2 X |
| 2,384,441 | 9/1945 | Carter | 180/6.2 X |
| 3,608,397 | 9/1971 | Honeyager et al. | 180/6.2 X |
| 3,765,258 | 10/1973 | Jespersen | |
| 3,771,615 | 11/1973 | Rieli | 180/6.48 |
| 3,796,275 | 3/1974 | Bouyer | 180/6.2 X |
| 3,942,390 | 3/1976 | Dunn | |
| 4,266,617 | 5/1981 | Mullet et al. | 180/6.48 X |
| 4,494,621 | 1/1985 | Nagata | 180/6.2 |

*Primary Examiner*—Charles A. Marmor
*Assistant Examiner*—Everett G. Diederiks, Jr.

[57] ABSTRACT

Separate left and right hydrostatic transmission (15) for controlling rotation of left and right final drive wheels (11) of a working vehicle independently are disposed laterally inwardly of the drive wheels in a vertical posture such that, while an input shaft (23) extends upwardly, an output shaft (24) extends downwardly. To each of the hydrostatic transmissions is attached a L-shaped gear box (16) which extends over lower and outer sides of the hydrostatic transmission and supports the axle (17) of final drive wheel at its upstanding portion. Within the box is housed first and second reduction gear trains which form a L-shaped transmission path between the output shaft and axle.

8 Claims, 8 Drawing Sheets

TRANSMISSION SYSTEM FOR WORKING VEHICLES

FIELD OF THE INVENTION

This invention relates to a transmission system for a relatively small-sized working vehicle such as mower tractor, and more particularly to a transmission system comprising hydrostatic transmissions by which the vehicle speed is continuously variable with a selective reverse for directional movement.

BACKGROUND OF THE INVENTION

U.S. Pat. Nos. 3,765,258 and 3,942,390, disclosure known a transmission system for working vehicles comprising a pair of separate left and right hydrostatic transmissions which transmit power of an engine towards left and right final drive wheels (travelling wheels or caterpillar track-driving wheels) independently at continuously variable transmission ratios. In such a transmission system, left and right speed-reduction mechanisms are interposed between the left and right hydrostatic transmissions and the left and right final drive wheels for transmitting rotation of output shafts of the hydrostatic transmissions to the final drive wheels with a reduced speed of rotation.

A vehicle including a transmission system of this type is steered or turned using a change lever device for controlling hydrostatic transmissions or variable displacement hydraulic pumps thereof. A spinning turn of the vehicle may be attained by controlling the left and right hydrostatic transmissions so as to drive the left and right final drive wheels to rotate in opposite directions with an equal speed of rotation. A gentle turn of the vehicle with a desired turning radius may be attained by controlling the left and right hydrostatic transmissions so as to drive the left and right final drive wheels to rotate in a same direction with different speeds of rotation. It is thus seen that a transmission system comprising a pair of separate left and right hydrostatic transmissions provides excellent maneuverability to a vehicle. Left and right speed-reduction mechanisms referred to before transmit the rotation of output shafts of left and right hydrostatic transmissions to axles of left and right final drive wheels with a reduced speed of rotation so as to enlarge torque for driving left and right travelling wheels or track-driving wheels. Such speed-reduction mechanisms will also eliminate, when a vehicle is travelling at a low speed, the necessity of controlling the vehicle speed by bringing hydrostatic transmissions into a low speed range where output rotation speed of the hydrostatic transmissions becomes unstable.

Two typical examples of the structure according to the prior art are shown in the two aforementioned U.S. patents.

In the transmission system shown in U.S. Pat. No. 3,765,258, the engine is mounted on a front portion of the vehicle in a posture slightly inclined towards a forward and downward direction. Forwardly of this engine and in the middle of width of the vehicle is arranged a gear box. Left and right hydrostatic transmissions are mounted on the left and right side walls of such gear box into which input shafts as well as output shafts of the left and right hydrostatic transmissions extend. Power of the engine is transmitted into the gear box and then to the input shafts via a bevel gearing. Axles of left and right track-driving wheels are arranged so that they extend from a low level within the gear box largely towards the left and right, respectively. Left and right speed-reduction mechanisms are disposed within the gear box and are composed of left and right gear trains each having a smaller spur gear on each of the output shafts and a larger spur gear on each of the axles.

In the transmission system shown in U.S. Pat. No. 3,942,930, while an engine is mounted on a front portion of vehicle, separate left and right hydrostatic transmissions are arranged on a rear portion of the vehicle in a horizontal posture such that input shafts thereof extend forwardly whereas output shafts extend rearwardly. A horizontal transmission shaft, drivenly connected to the engine output shaft, is provided which passes between the left and right hydrostatic transmissions and extends to a rear end portion of the vehicle so as to be utilized as a power takeoff shaft for a working implement. Input shafts of the left and right hydrostatic transmissions are drivenly connected to such transmission shaft via left and right transmission devices having belts, respectively. Left and right final drive units which comprise as output shafts thereof axles of left and right track-driving wheels are disposed on the underside of vehicle and behind the left and right hydrostatic transmissions. The left and right drive units comprise forwardly extending left and right input shafts between which a horizontal cluster-sprocket support shaft is disposed. Left and right speed-reduction mechanisms are provided each of which comprises first and second speed-reducing trains having first and second chains. The first chain is entrained over a first sprocket, fixedly mounted on the output shaft of each hydrostatic transmission, and a second sprocket rotatably mounted on the sprocket support shaft. The second chain is entrained over a third sprocket, rotatably mounted on the support shaft and rotatable in unison with the second sprocket, and a fourth sprocket fixedly mounted on the input shaft of each drive unit.

As described above, the transmission system disclosed in U.S. Pat. No. 3,942,390 is designed so that the hydrostatic transmission and final drive unit of each of the left and right sides are provided separately from each other and are placed at different locations. Between said hydrostatic transmission and final drive unit are disposed two trains of chains. It is thus seen that the transmission system occupies a considerable space as a whole and the assemblage thereof is troublesome. Contrarily to this, the transmission system disclosed in U.S. Pat. No. 3,765,258 occupies a relatively small space and can be assembled with ease. This is because the left and right hydrostatic transmissions employed in this system are mounted on the outer surfaces of a gear box including a bevel gearing, by which a transmission path from the engine is bent and is connected to the input shafts of left and right hydrostatic transmissions, and left and right reduction gear trains which are disposed between the output shafts of left and right hydrostatic transmissions and the axles of left and right track-driving wheels.

The transmission system disclosed in U.S. Pat. No. 3,765,258 includes, however, only one reduction gear train in each of the transmission paths between the left and right hydrostatic transmissions and the left and right track-driving wheels and is thus inferior to the transmission system disclosed in U.S. Pat. No. 3,942,390 by having a decreased ability of enlarging the vehicle-driving torque and also in securing a stable vehicle speed at a low speed range. It is considered that, if a further reduction gear train were additionally provided at each side of the interior of the gear box disclosed in U.S. Pat. No. 3,765,258, then it would be required to enlarge such gear box considerably either in length or in height. Enlargement of the gear box in length will result in an enlargement of the length of vehicle. Enlargement of the gear box in height will cause an undue lowering of the level of final drive wheels and axles thereof so that a stable support of vehicle body by caterpillar tracks or travelling wheels is lessened.

In a transmission system comprising left and right wheel axles which extend laterally outwardly from a gear box having a small width and arranged in the middle of width of the vehicle, such as the one disclosed in U.S. Pat. No. 3,765,258, a large interval is caused between each caterpillar track or travelling wheel, which supports the vehicle on the ground, and the heavy gear box and hydrostatic transmissions so that a large stiffness is required to the vehicle body or frame. Furthermore, concentrated arrangement of transmission units in the middle of width of the vehicle may provide a restriction to the arrangement of a power take-off mechanism which is often designed to have a transmission path extending through such middle portion of the vehicle.

OBJECTS

Accordingly, a primary object of the present invention is to provide a novel transmission system of the type comprising separate left and right hydrostatic transmissions and speed-reduction mechanisms, wherein each of the reduction mechanisms includes two sets of speed-reduction trains in a very compact fashion adapted to be affixed to each of the hydrostatic transmissions so as to permit an easy assemblage of the transmisssion system. Further the left and right hydrostatic transmissions and speed-reduction mechanisms are disposed in the proximity of left and right final drive wheels so as to attain a stable support of the transmission units and so as not to provide a restriction to the arrangement of a power take-off mechanism.

A further object of the present invention is to provide a transmission system for working vehicles wherein the whole of transmission units including a power take-off mechanism is placed concentratedly at a same location in the axial direction of vehicle so as to reduce the length of vehicle and so as to secure a large space for a mid-mount working implement, such as mid-mount mower, at the underside of vehicle.

BRIEF DESCRIPTION OF THE DRAWINGS

Other objects and advantages of the invention will become readily apparent as the specification is considered in conjunction with the accompanying drawings, in which.

SUMMARY OF THE INVENTION

Figures 1, 8, 9:
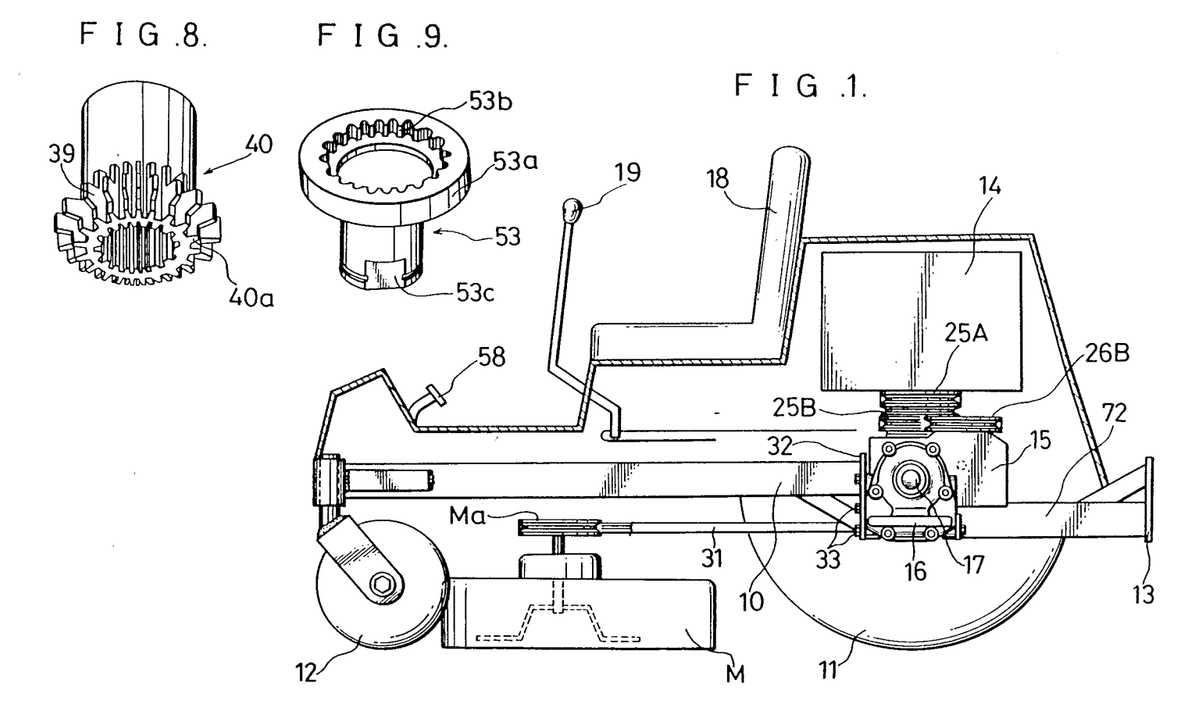
FIG. 1 is a schematic side view, partially in section, of a working vehicle in which an embodiment of the transmission system according to the present invention is employed.
FIG. 8 is an enlarged perspective view of a sleeve member shown in FIG. 4.
FIG. 9 is an enlarged perspective view of a brake shaft shown in FIG. 4.
Figure 2:
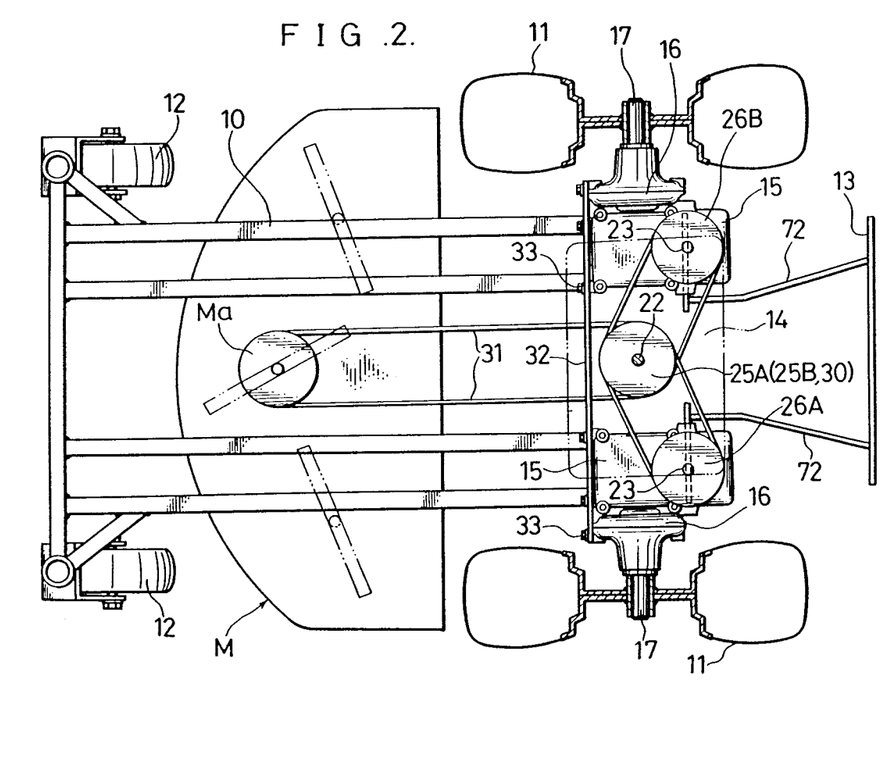
FIG. 2 is a schematic plane view, partially in section, of a lower half of the working vehicle shown in FIG. 1.
Figure 10:
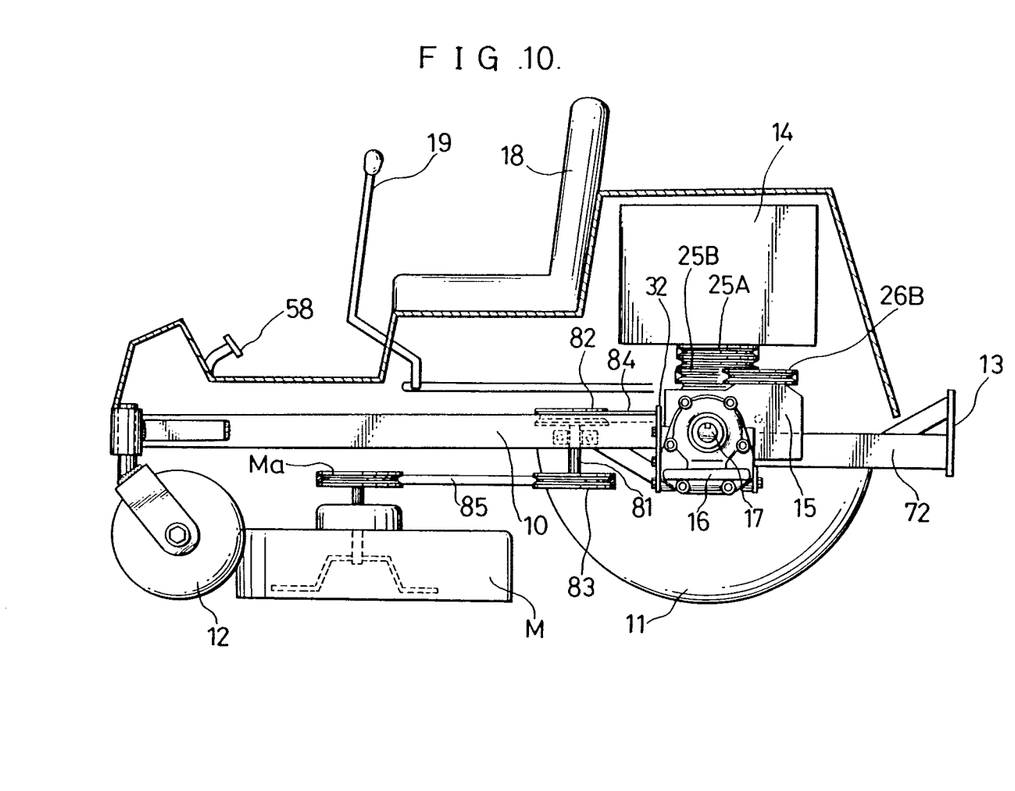
FIG. 10 is a schematic side view similar to FIG. 1, but showing a working vehicle in which a second embodiment of the transmission system according to the present invention is employed.
Figure 11:
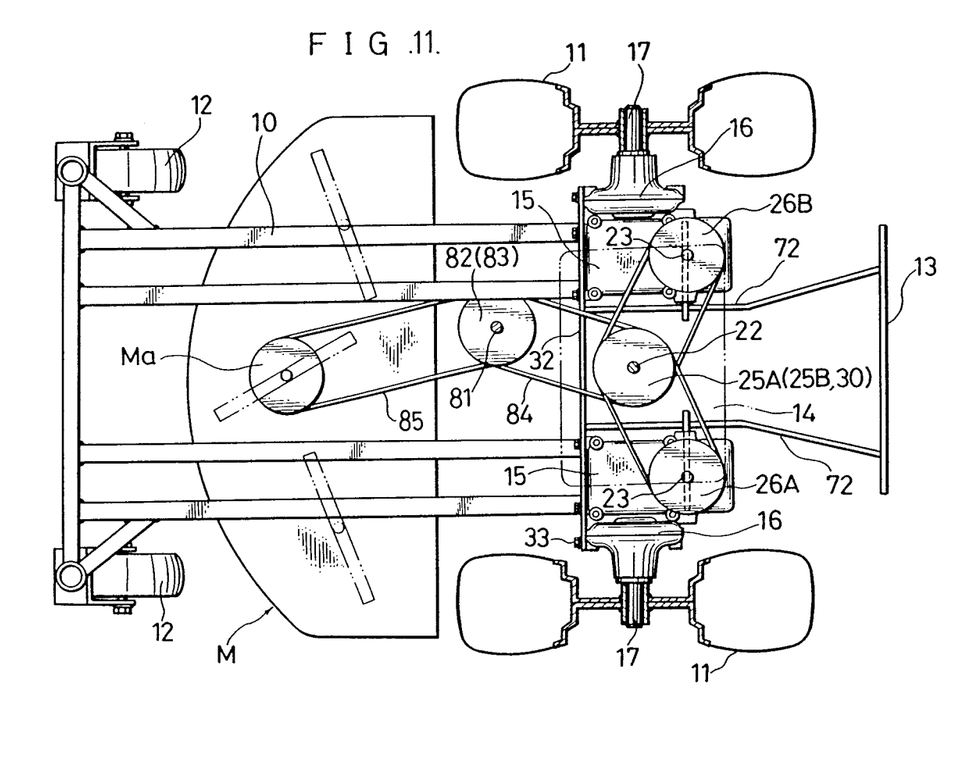
FIG. 11 is a schematic plane view, partially in section, of a lower half of the working vehicle shown in FIG. 10.

The present invention relates to a transmission system for working vehicles which comprises, as shown in FIGS. 1 and 2 and in FIGS. 10 and 11, respectively, a pair of separate left and right hydrostatic transmissions 15 for transmitting power of an engine 14 towards left and right final drive wheels 11 with a continuously variable speed, respectively; and left and right speed-reduction mechanisms 28 (FIG. 4) interposed between the left and right hydrostatic transmissions 15 and the left and right final drive wheels 11.

Figure 3:
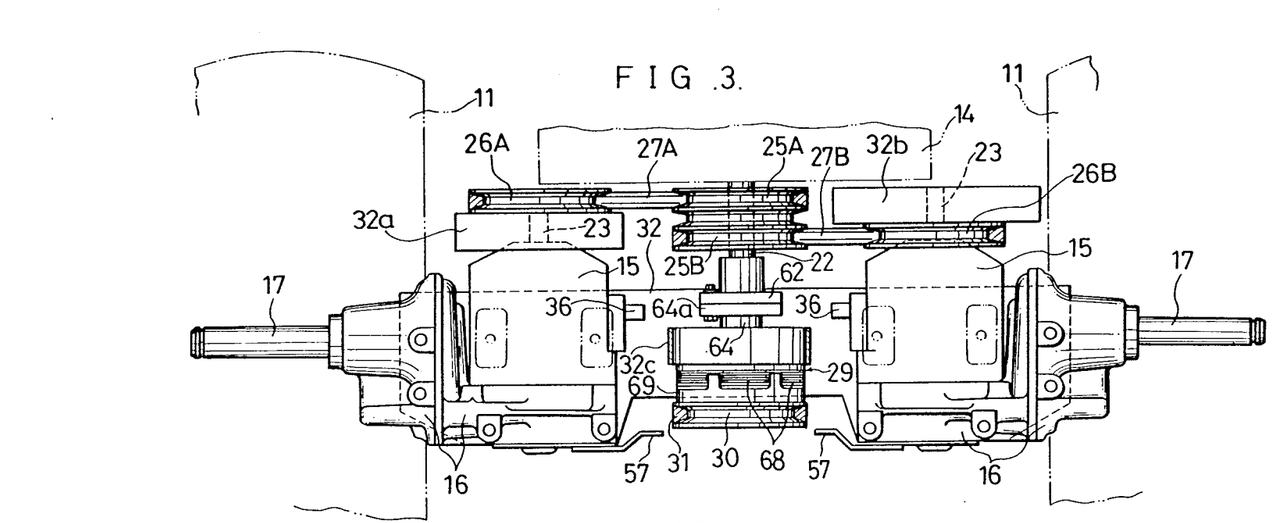
FIG. 3 is a rear view, partially in section, of an essential part of the transmission system employed in the working vehicle shown in FIGS. 1 and 2.
Figures 4, 7:
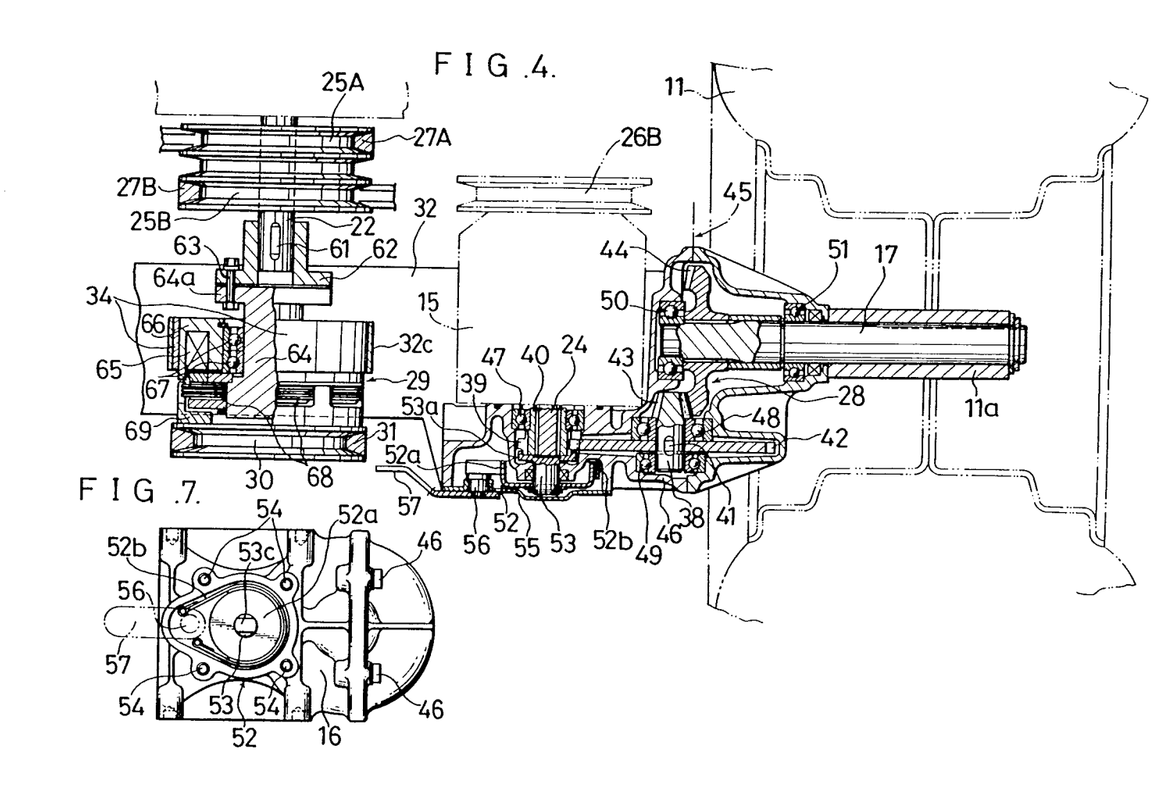
FIG. 4 is an enlarged sectional rear view of a part of the transmission system shown in FIG. 3.
FIG. 7 is a bottom view of a part of the transmission system shown in FIG. 3 with a cover plate for brake mechanism removed.
Figure 5:
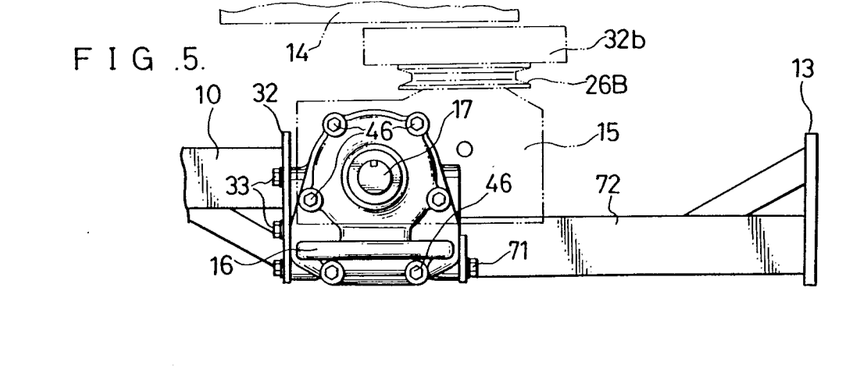
FIG. 5 is a side view of the transmission system shown in FIG. 3.

As shown in FIGS. 3 and 4, the left and right hydrostatic transmissions 15 are disposed, respectively, laterally inwardly of the left and right final drive wheels 11 in a vertical posture such that an input shaft 23 of each of the hydrostatic transmissions 15 extends upwardly whereas an output shaft 24 thereof extends downwardly. Axles 17 of the left and right final drive wheels 11 are disposed at a mid level between the top and bottom levels of the hydrostatic transmissions 15.

As shown in FIG. 4, each of the left and right speed-reduction mechanisms 28 is provided with an intermediate shaft 38 which is disposed below an inner end portion of the axle 17 and extends parallel with the output shaft 24. Each of the speed-reduction mechanisms 28 includes a first reduction gear train, which comprises a smaller spur gear 39 fixedly mounted on the output shaft 24 and a larger spur gear 42 fixedly mounted on the intermediate shaft 38 and meshing with the smaller spur gear 39, and a second reduction gear train which comprises a smaller bevel gear 43 fixedly mounted on the intermediate shaft 38 and a larger bevel gear 44 fixedly mounted on the axle 17 and meshing with the smaller bevel gear 43.

In the transmission system shown, the final drive wheels are left and right rear wheels 11. Each of the left and right speed-reduction mechanisms 28, which forms a bent transmission path of L-shape between the vertical output shaft 24 of each hydrostatic transmission 15 and the horizontal axle 17 of a higher level, is housed within a substantially L-shaped gear box 16 which is attached to the bottom of each hydrostatic transmission 15 and extends over lower and outer side of such hydrostatic transmission.

The first reduction gear train of each speed-reduction mechanism 28 comprising meshing spur gears 39 and 42 performs a first stage speed-reduction at a location just below each hydrostatic transmission 15, whereas the second reduction gear train comprising meshing bevel gears 43 and 44 performs a second stage speed-reduction at a location just outside the hydrostatic transmission 15. The speed-reduction mechanism 28 including such first and second reduction gear trains is disposed compactly over lower and outer sides of the hydrostatic transmission and may be housed within a L-shaped gear box attached to the hydrostatic transmission. The hydrostatic transmission 15 and speed-reduction mechanism 28 of each side may be preassembled and handled as a unit for an easy assemblage of the transmission system.

The speed-reduction mechanism 28 occupies only a narrow space at the outer side of hydrostatic transmission 15, because the mechanism 28 comprises at said outer side only the second reduction gear train having meshing bevel gears 43 and 44. It is thus seen that the left and right hydrostatic transmissions 15 may be disposed in the proximity of left and right final drive wheels 11 for attaining a stable support of the hydrostatic transmissions 15 and speed-reduction mechanisms 28 associated therewith and also for securing a space for power take-off mechanism between the separate left and right hydrostatic transmissions 15.

Furthermore, each of the speed-reduction mechanisms 28 bends the transmission path from the lower side of hydrostatic transmission 15 upwardly to the outer side of such transmission 15 so as to permit a mid level arrangement of the wheel axle 17 between the top and bottom levels of the hydrostatic transmission 15 so that an undue lowering of the level of the final drive wheel 11 and its axle 17 is not caused.

In a transmission system including a rotatable power takeoff member which is driven to rotate by engine, an engine 14 is preferably arranged according to the present invention above and in the middle of separate left and right hydrostatic transmissions 15 in a vertical posture such that an engine output shaft 22 extends downwardly. The engine output shaft 22 is drivingly connected to upwardly extending input shafts 23 of the left and right hydrostatic transmissions 15 via endless and flexible transmission means which are entrained over wheels 25A and 25B, fixedly mounted on the engine output shaft 22, and wheels 26A and 26B fixedly mounted on the input shafts 23 of the left and right hydrostatic transmissions 15. Further, the rotatable power take-off member is composed of a pulley 30 disposed between the left and right hydrostatic transmissions 15 and adapted for rotation by the engine output shaft 22 through a clutch 29 below the wheels 25A, 25B on the engine output shaft.

The structure set forth above achieves a concentrated arrangement of the whole of transmission units including a power take-off mechanism at a same location of the length of vehicle where left and right final drive wheels 11 are disposed, because the engine 14, driving wheels 25A and 25B on the engine output shaft 22, power take-off clutch 29, and power take-off pulley 30 are all located between the left and right hydrostatic transmissions 15. The concentrated arrangement of the whole of the transmission units at a same location in the axial direction of vehicle contributes to the reduction of the length of vehicle as well as to secure a large space for a mid-mount working implement, such as mid-mount mower, at the underside of vehicle.

DESCRIPTION OF PREFERRED EMBODIMENTS

Vehicle Structure

In FIGS. 1 to 9, a first embodiment of the present invention is illustrated. Structure of a working vehicle in which the first embodiment is employed is schematically shown in FIGS. 1 and 2.

The working vehicle shown is a mower tractor having a vehicle frame 10 of joined plate members. The vehicle is designed so as to be travelled by the rotation of left and right rear wheels 11. The vehicle is steered by driving the left and right rear wheels 11 to rotate with different speeds of rotation or to rotate in opposite directions, as will be detailed later. Left and right front wheels 12 are composed of casters each of which is supported pivotally about a vertical axis at the front end of the frame 10. Behind the vehicle frame 10 is provided a bumper 13 which is located rearwardly of the rear wheels 11. Before the rear wheels 11 and at the underside of vehicle frame 10 is mounted a mid-mount mower M.

As also shown in FIGS. 1 and 2, an engine 14 is mounted at a rear end portion of the vehicle frame in a vertical posture such that the output end of such engine is directed downwardly. Below and at both sides of the engine are arranged separate left and right hydrostatic transmissions 15 each having a gear box 16, affixed thereto, which extends over the lower and outer sides of hydrostatic transmission 15. Axle 17 of each rear wheel 11 is projected sidewardly from each gear box 16.

Before the engine 14 is arranged a seat 18. A pair of left and right change levers 19 are provided which have their operating ends before the seat.

Arrangement of Transmission Units

As shown in FIGS. 3 and 4, engine 14 has a downwardly extending output shaft 22. The left and right hydrostatic transmissions 15 are disposed, respectively, laterally inwardly of the left and right rear wheels 11 in a vertical posture such that an input shaft 23 of each hydrostatic transmission 15 extends upwardly whereas an output shaft 24 thereof extends downwardly. From a variable displacement hydraulic pump and a fixed displacement hydraulic motor (both not shown) of each hydrostatic transmission 15, the pump is disposed rearwardly of the motor so that the input shaft 23 which is a pump shaft of the hydraulic pump is located more rearwardly than the output shaft 24 which is a motor shaft of the hydraulic motor.

On the engine output shaft 22, are fixedly mounted two pulleys 25A and 25B which are formed integral with each other. Corresponding pulleys 26A and 26B are fixedly mounted on the input shafts 23 of the left and right hydrostatic transmissions 15. Power from the engine 14 is transmitted to the left and right hydrostatic transmissions via a belt 27A entrained over the pulleys 25A and 26A and via a belt 27B entrained over the pulleys 25B and 26B, respectively. The belt drive shown may be substituted by a chain drive. Each of the gear boxes 16 is fastened to the bottom of each hydrostatic transmission by means of fastening bolts (not shown) and supports the rear wheel axle 17 at a mid level between the top and bottom levels of the hydrostatic transmission. Within each gear box 16 is housed a speed-reduction mechanism 28 which will be detailed later. Rotation of the output shaft 24 of each hydrostatic transmission 15 is transmitted to the axle 17 with a reduced speed of rotation via the speed-reduction mechanism 28 so as to drive the rear wheel 11.

As also shown in FIG. 3 and 4, a PTO-clutch 29 and a PTO-pulley 30 are arranged coaxially with the engine output shaft between the left and right hydrostatic transmissions 15. The PTO-pulley 30 is provided for driving the mower M and drives an input pulley Ma of such mower to rotate via a belt 31 shown in FIG. 1 and 2.

Figure 6:
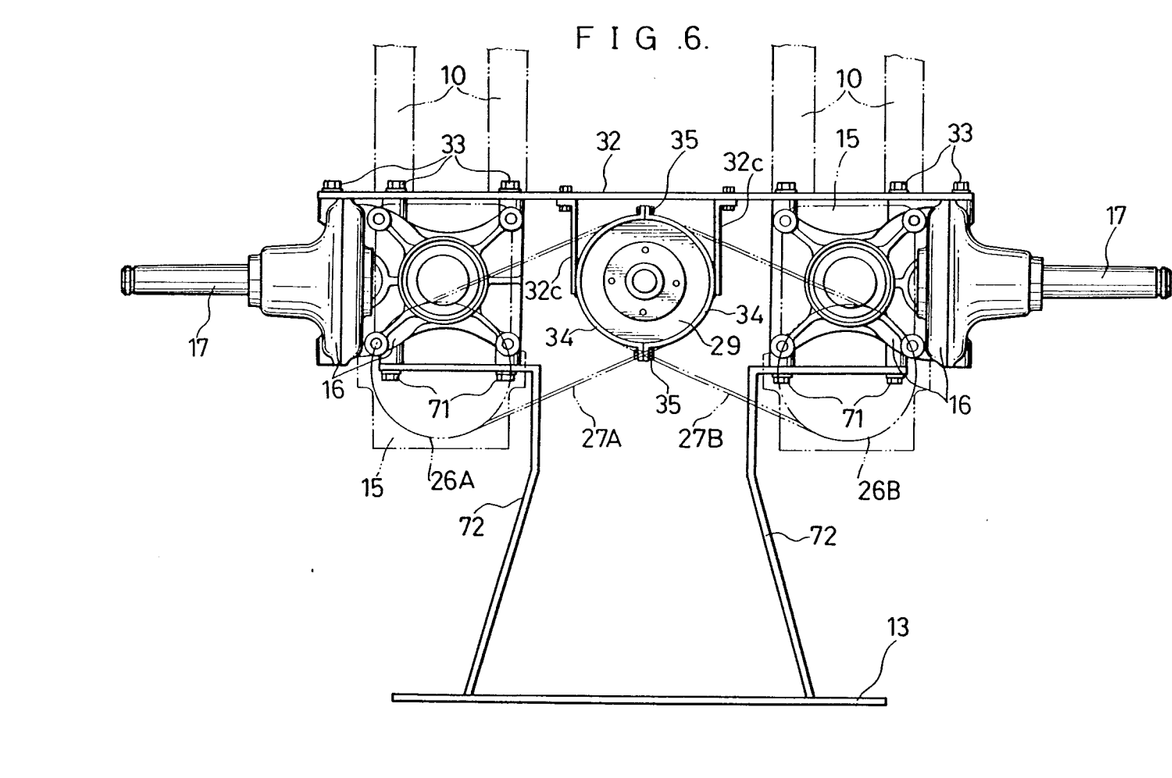
FIG. 6 is a plane view of a lower half of the transmission system shown in FIG. 3.

The vehicle frame 10 has therein a frame plate 32 which extends laterally at the front of the left and right hydrostatic transmissions 15. The hydrostatic transmissions 15 and gear boxes 16 are secured to such frame plate 32 using bolts 33 shown in FIG. 6 and in FIGS. 1 and 2. Input shafts 23 of the left and right hydrostatic transmission 15 are rotatably supported by left and right bearing holders 32a and 32b shown in FIG. 3 which are secured to the frame plate 32. As shown in FIG. 6, the PTO-clutch 29 is supported using a pair of semi-circular fastening bands 34 which are fastened to each other using a pair of fastener devices 35. The fastening bands 34 are welded to a pair of left and right support plates 32c which are secured to the rear surface of frame plate 32.

As shown in FIG. 3, control shafts 36 for controlling swash plates of the hydraulic pumps (not shown) of the left and right hydrostatic transmissions 15 are projected laterally inwardly and are operatively connected to the left and right change levers 19 shown in FIG. 1.

Speed-Reduction Mechanisms

Both of the speed-reduction mechanisms 28 affixed to the left and right hydrostatic transmissions 15 have the same structure and the following descriptions of one of these mechanisms will suffice for both.

As shown in FIG. 4 with regard to the speed-reduction mechanism 28 affixed to one of the hydrostatic transmissions 15, the gear box 16 journals therein an intermediate shaft 38 of a small length which is disposed below an inner end portion of the rear wheel axle 17 and extends parallel with the output shaft 24 of hydrostatic transmission 15. A sleeve member 40 having thereon an integral smaller spur gear 39 is fixedly mounted on the output shaft 24 by a spline connection, whereas a larger spur gear 42 is fixedly mounted on the intermediate shaft 38 using a key 41. These smaller and larger spur gears 39 and 42 are meshed with each other so as to provide a first reduction gear train. The intermediate shaft 38 is formed integrally at its upper end portion with a smaller bevel gear 43, whereas a larger bevel gear 44 is fixedly mounted on an inner end portion of the wheel axle 17 by a spline connection. These smaller and larger bevel gears 43 and 44 are meshed with each other so as to provide a second reduction gear train. The speed-reduction mechanism 28 transmits a rotation of the output shaft 24 to the rear wheel axle 17 through the first and second reduction gear trains so that the axle 17 is driven to rotate with a largely reduced speed of rotation.

The speed-reduction mechanism 28 comprising the first and second reduction gear trains set forth above forms a bent transmission path of L-letter shape. Correspondingly, the gear box 16 is L-shaped. As a dividing plane of the gear box 16 for permitting a formation of such box by casting, a vertical plane 45 is selected which extends across the larger bevel gear 44 so as to divide the box 16 into two parts. Selection of such dividing plane 45 permits to assemble an outer half of the box, to which the axle 17 and larger bevel gear 44 are previously assembled, to an inner half of the box 16 from the outer side. The inner and outer halves of gear box 16 are fastened together by bolts 46 shown in FIG. 5 which are threadingly inserted from the outer side of the box 16.

The output shaft 24 is rotatably supported by the gear box 16 through a ball bearing 47, whereas the intermediate shaft 38 is rotatably supported by the box 16 through a pair of ball bearings 48 and 49 which are disposed at upper and lower sides of the spur gear 42. The rear wheel axle 17 is supported by the gear box 16 through a pair of laterally spaced ball bearings 50 and 51 and has thereon a wheel boss 11a of the rear wheel 11 which is keyed to an outer half of the axle 17.

Of the shafts journalled in the gear box 16, the output shaft 24 has the smallest torque. A brake 52 for braking such output shaft 24 is appended to the speed-reduction mechanism 28, as shown in FIG. 4.

This brake 52 includes a brake shaft 53 having at its upper ring portion 53a internal gear teeth 53b (FIG. 9) which are meshed with gear teeth 40a (FIG. 8) formed to the sleeve member 40 at a lower end portion thereof below the spur gear 39. This brake shaft 53 which is coaxial with the output shaft 24 has a lower end portion including thereon a pair of cut-outs 53a (FIGS. 7 and 9) on which a brake drum 53a is fixedly mounted. As shown in FIGS. 4 and 7, a brake band 52b is provided which is pressingly engaged, when tightened, with the outer circumference of brake drum 52a so as to brake the drum and brake shaft 53. A vertical control shaft 56 for tightening the brake band 52b is rotatably supported by a cover plate 55 which is secured to the bottom of the gear box 16 so as to cover the brake mechanism by means of bolts (not shown) threadingly inserted into threaded bores 54 shown in FIG. 7. To the lower or outer end of the control shaft 56 is secured a brake arm 57. Such brake arms 57 for the left and right brakes 52 are operatively connected to left and right brake pedals 58 one of which is shown in FIG. 1.

The brake 52 shown is provided in a compact structure without being subjected to length restrictions as distinguished from conventional output shafts on hydrostatic transmissions. That is, if a spur gear corresponding to the spur gear 39 were mounted directly on the output shaft of a standard hydrostatic transmission, then a brake member co-rotatable with the output shaft such as a brake drum or brake disk could be provided to the output shaft without regard to restricting from the length of such output shaft. Contrarily, the spur gear 39 shown on sleeve member 40 shown in FIG. 8 which is adapted to be mounted on the output shaft 24 using a spline connection. Sleeve member 40 is also formed with gear teeth 40a which may be machined together with the spur gear 39. By utilizing the sleeve member 40 or the gear teeth 40a thereon as coupling means, a brake shaft 53 of a small length shown in FIG. 9 which includes a diameter enlarged upper ring 53a having therein internal gear teeth 53b as coupling means is provided coaxially and co-rotatably with the output shaft 24 for providing a brake drum 52a below the output shaft 24. The brake 52, which may have a relatively small capacity because it brakes the output shaft having the smallest torque, is thus arranged in a compact design within a space below the output shaft which space is afforded by a laterally extending transmission path formed by the meshing spur gears 39 and 42.

Power Take-Off Mechanism

The PTO-clutch 29 is designed to be electromagnetic clutch. As clearly shown in FIG. 4, the clutch 29 includes a drive shaft 64 having at its upper end an integral coupling half 64 which is coupled by fastener devices 63 to a coupling half 62 which in turn is fixedly mounted on a lower end portion of the engine output shaft 22 using a key 61. The drive shaft 64 is rotatably supported through a pair of ball bearings 67 by a hollow cylindrical member 66 which in turn is fixedly supported by the fastening bands 34 referred to previously. The cylindrical member 66 has therein an electromagnetic coil 65. The PTO-pulley 30 is secured to a driven ring 69 which is driven to rotate, when the coil is energized, by the drive shaft 64 through a clutch-engaging portion 68.

In the first embodiment shown in FIGS. 1 to 7, the bumper 13 referred to before is attached to a pair of left and right bumper frames 72 which are attached at their fore ends, as shown in FIG. 6, to the outermost surfaces of the left and right gear boxes 16. Bumper frames 72 provide no restriction to the arrangement of PTO-clutch 29 and PTO-pulley 30. From this, the PTO-pulley 30 is disposed at a low level between the left and right gear boxes 16 in a fashion such that the pulley 30 is located at the level of input pulley Ma of the midmount mower M so as to permit a direct belt-transmission between the pulleys 30 and Ma.

Operation

During movement of the mower tractor shown in FIGS. 1 and 2, change of the vehicle speed and selective reversing of the vehicle are performed by operating the change levers 19 shown in FIG. 1 to vary the angle of swash plates of the variable displacement hydraulic pumps (not shown) in the hydrostatic transmissions 15 via the control shafts 36 shown in FIG. 3. Steering of the vehicle is performed also by operating the change levers 19. When the output shafts 24 of the left and right hydrostatic transmissions 15 are rotated into opposite directions with an equal speed of rotation, a spin turn of the vehicle is attained. By controlling the left and right hydrostatic transmissions 15 so as to drive the left and right rear wheels 11 to rotate into a same direction with different speeds of rotation, the vehicle may be turned with a turning radius which corresponds to the difference in rotation speeds between the left and right rear wheels 11.

The pair of change levers 19 employed in the tractor shown may be substituted by a single change lever which is operated for controlling the left and right transmissions for speed-change and steering purposes. An example of such single change lever is disclosed in U.S. Pat. No. 3,765,258 referred to before.

Left and right brakes 52 are operated selectively by treading-down the pedals 58 shown in FIG. 1 so as to tighten the brake band 52b against brake drum 52a shown in FIGS. 4 and 7. Rear wheels 11 are braked by the braking of output shafts 24 of the hydrostatic transmissions 15. When the vehicle is parked, the left and right pedals 58 are locked at their trodden-down positions for preventing a spontaneous start of the vehicle.

Mowing with the mower M is performed in a condition where the PTO-clutch 29 shown in FIG. 4 is engaged so as to transmit power from PTO-pulley 30 to the input pulley Ma of mower. Because the vehicle may be travelled at a continuously variable speed and also may be turned with a desired optional turning radius, the functional efficiency is excellent.

Second Embodiment

Figure 12:
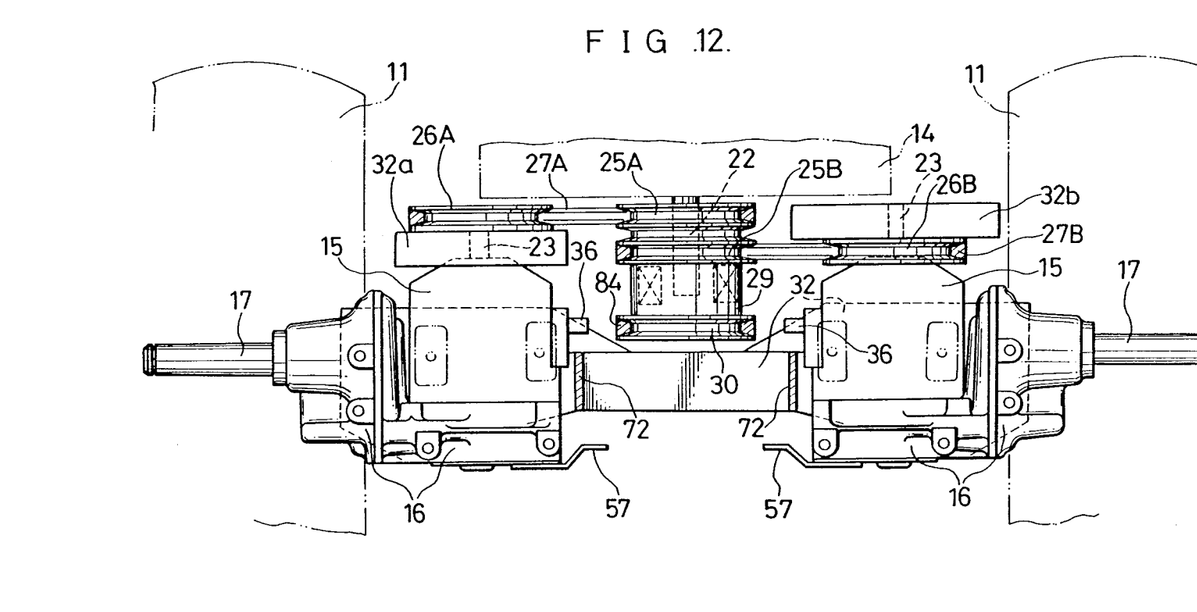
FIG. 12 is a rear view, partially in section, of an essential part of the transmission system employed in the working vehicle shown in FIGS. 10 and 11.

A second embodiment is shown in FIGS. 10 to 12 in which numerals used in FIGS. 1 to 9 are also used for designating like parts.

In the working vehicle employing a transmission system of the second embodiment a frame plate 32 which corresponds to the frame plate 32 employed n the first embodiment is reduced in height at a middle portion thereof located between left and right hydrostatic transmissions 15, as can be seen from FIG. 12. A PTO-pulley 30 is disposed above and behind such height-reduced middle portion of the frame plate 32. A PTO-clutch 29 is affixed to the bottom of a drive pulley 25B which is similar to the pulley 25B employed in the first embodiment. A lower end portion of engine output shaft 22 extends into the clutch 29 so as to provide a drive shaft of the clutch.

Because the PTO-pulley 30 is located at a level higher than that of input pulley Ma of the mower M, a vertical counter shaft 81 shown in FIGS. 10 and 11 is journalled in the frame 10 for transmitting power from PTO-pulley 30 to the input pulley Ma. A belt 84 is entrained over the PTO-pulley 30 and a counter pulley 82 fixedly mounted on an upper end portion of the counter shaft 81, whereas another belt 85 is entrained over another counter pulley 83, fixedly mounted on a lower end portion of the counter shaft 81, and the input pulley Ma. As shown in FIG. 12, left and right bumper frames 72 for supporting a bumper 13 are attached to the rear surface of the frame plate 32 by welding and extend rearwardly.

The other parts of the second embodiment are substantially the same with the corresponding parts of the first embodiment. Consequently, the transmission system of the second embodiment operates similarly to that of the first embodiment.

We claim:

1. A transmission system for working vehicles which comprises: a pair of separate left and right hydrostatic transmissions for transmitting power of an engine towards left and right final drive wheels with a continuously variable speed, respectively; and left and right speed-reduction mechanisms interposed between said left and right hydrostatic transmissions and said left and right final drive wheels, characterized in:

that said left and right hydrostatic transmissions (15) having top and bottom levels are disposed, respectively, laterally inwardly of said left and right final drive wheels (11) in a vertical posture such that an input shaft (23) of each of said hydrostatic transmissions extends upwardly whereas an output shaft (24) thereof extends downwardly, axles (17) of said left and right final drive wheels being disposed at a mid level between said top and bottom levels of said hydrostatic transmissions; and that each of said left and right speed-reduction mechanisms (28) is provided with an intermediate shaft (38) disposed below an inner end portion of said axle (17) and extending parallel with said output shaft (24), each of said speed-reduction mechanisms including a first reduction gear train, which comprises a smaller spur gear (39) fixedly mounted on said output shaft and a larger spur gear (42) fixedly mounted on said intermediate shaft and meshing with said smaller spur gear, and a second reduction gear train which comprises a smaller bevel gear (43) fixedly mounted on said intermediate shaft and a larger bevel gear (44) fixedly mounted on said axle and meshing with said smaller bevel gear.

2. A transmission system as claimed in claim 1, wherein each of said speed-reduction mechanisms (28) is housed within a substantially L-shaped gear box (16) attached to the bottom of each of said hydrostatic transmissions (15), said gear box extending over lower and outer sides of said each hydrostatic transmission.

3. A transmission system as claimed in claim 2, wherein said gear box (16) is divided into two parts along a vertical plane (45) extending across said larger bevel gear (44).

4. A transmission system as claimed in claim 1, wherein a brake (52) has means for engaging and for braking said output shaft (24).

5. A transmission system as claimed in claim 1, wherein said engine (14) is arranged above and in the middle of said left and right hydrostatic transmissions (15) in a vertical posture such that an engine output shaft (22) extends downwardly, said engine output shaft being drivingly connected to said input shafts (23) of said hydrostatic transmissions via endless and flexible transmitting means (27A, 27B) which are entrained over wheels (25A, 25B), fixedly mounted on said engine output shaft, and wheels (26A, 26B) fixedly mounted on said input shafts.

6. A transmission system for working vehicles which comprises: a pair of separate left and right hydrostatic transmissions for transmitting power of an engine towards left and right final drive wheels with a continuously variable speed, respectively; left and right speed-reduction mechanisms interposed between said left and right hydrostatic transmissions and said left and right final drive wheels; and a rotatable power take-off member driven to rotate by said engine, characterized in:

that said left and right hydrostatic transmissions (15) are disposed, respectively, laterally inwardly of said left and right final drive wheels (11) in a vertical posture such that an input shaft (23) of each of said hydrostatic transmissions extends upwardly whereas an output shaft (24) thereof extends downwardly, axles (17) of said left and right final drive wheels being disposed at a mid level between top and bottom levels of said hydrostatic transmissions;

that each of said left and right speed-reduction mechanisms (28) is provided with an intermediate shaft (38) disposed below an inner end portion of said axle (17) and extending parallel with said output shaft (24), each of said speed-reduction mechanisms including a first reduction gear train, which comprises a smaller spur gear (39) fixedly mounted on said output shaft and a larger spur gear (42) fixedly mounted on said intermediate shaft and meshing with said smaller spur gear, and a second reduction gear train which comprises a smaller bevel gear (43) fixedly mounted on said intermediate shaft and a larger bevel gear (44) fixedly mounted on said axle and meshing with said smaller bevel gear;

that said engine (14) is arranged above and in the middle of said left and right hydrostatic transmissions (15) in a vertical posture such that an engine output shaft (22) extends downwardly, said engine output shaft being drivingly connected to said input shafts (23) of said hydrostatic transmissions via endless and flexible transmitting means (27A, 27B) which are entrained over wheels (25A, 25B), fixedly mounted on said engine output shaft, and wheels (26A, 26B) fixedly mounted on said input shafts; and that said rotatable power take-off member is composed of a pulley (30) disposed between said left and right hydrostatic transmissions (15) and rotated by said engine output shaft (22) through a clutch (29) which is arranged below said wheels (25A, 25B) on said engine output shaft.

7. A transmission system as claimed in claim 6, wherein said left and right speed-reduction mechanisms are housed within substantially L-shaped left and right gear boxes (16) attached to the bottom of said left and right hydrostatic transmissions(15), each of said gear boxes extending over lower and outer sides of each of said left and right hydrostatic transmission.

8. A transmission system as claimed in claim 7, wherein a pair of left and right bumper frames (72) having at their outer ends a bumper (13) attached thereto are attached at their inner ends to outermost surfaces of said left and right gear boxes (16), said pulley (30) being located between said left and right gear boxes.

* * * * *